Dec. 11, 1951 M. E. MOHR 2,577,795

STABILIZED FREQUENCY MODULATED MULTIVIBRATOR

Filed Dec. 30, 1949

INVENTOR
M. E. MOHR
BY N. S. Ewing
ATTORNEY

Patented Dec. 11, 1951 2,577,795

UNITED STATES PATENT OFFICE 2,577,795

STABILIZED FREQUENCY-MODULATED MULTIVIBRATOR

Milton E. Mohr, New Providence, N. J., assignor to Bell Telephone Laboratories, Incorporated, New York, N. Y., a corporation of New York Application December 30, 1949, Serial No. 136,063

11 Claims. (Cl. 332—19)

Figure 1:
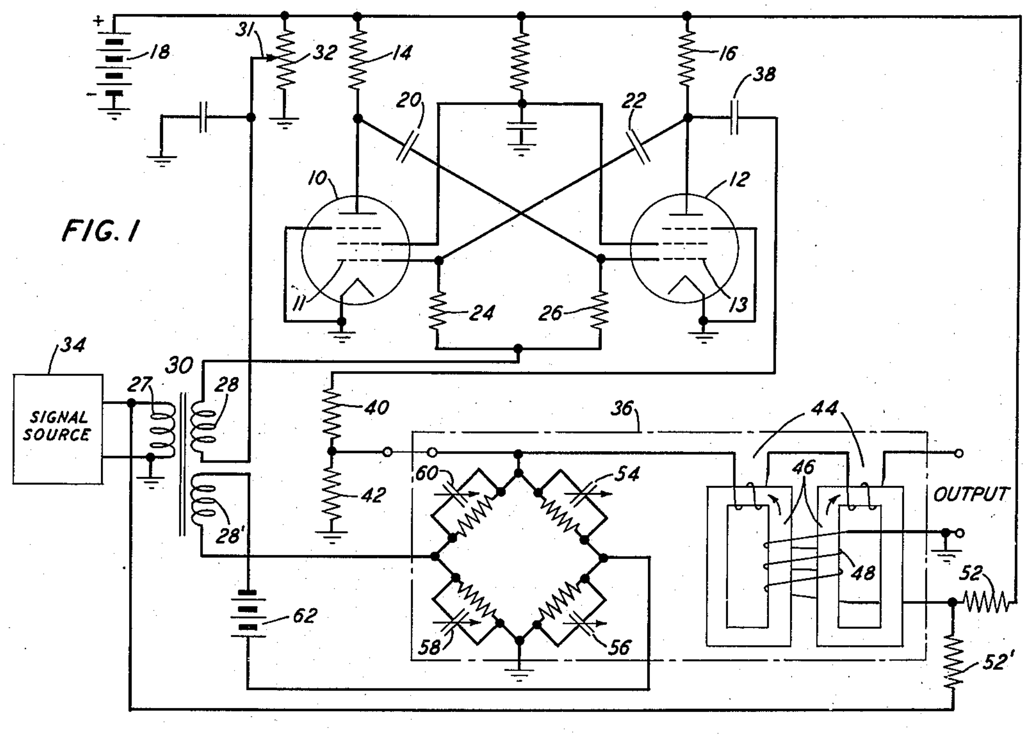

This invention relates to electric signaling circuits and is more specifically concerned with modulatory systems in which the frequency of an electric signal is varied in accordance with variations in the amplitude of a controlling signal.

It has been suggested that a multivibrator oscillator and a fixed frequency low-pass output filter be combined in a system for producing a frequency modulated signal, the frequency of which varies in substantially linear relationship to the variable amplitude of a modulating signal. Such systems are susceptible to spurious frequency changes that arise from variations in the anode potential supply. They are also restricted in the range of their frequency swing or variation because of the fixed cut-off frequency of the output filter.

It is accordingly an object of this invention to effect improvements in such modulating systems whereby their operation is substantially unaffected by variations in the circuit voltages; and whereby the frequency of the output signal varies in substantially linear relation over an exceptionally wide range of frequencies with variations in the amplitude of the applied signal.

It is a feature of this invention that the unmodulated or mean carrier frequency of the system is stabilized against variations arising from changes in the source of anode potential.

It is also a feature of this invention that a generator of square or rectangular shaped waves is utilized in the production of a sinusoidal shaped output wave, the frequency of which varies over an exceptionally wide range in accordance with changes in the amplitude of the applied signal.

The invention is further featured in that unwanted harmonically related wave components originating in the frequency modulated generator are suppressed by an electrical network the transmission characteristic of which is controlled by the amplitude of the modulating input signal wave.

In accordance with the invention, the oscillation frequency of a stabilized relaxation type oscillator is linearly varied over an exceptionally wide range of frequencies in accordance with the varying amplitude of a modulating signal. The signal controlled output of this oscillator is transmitted through a variable electrical network, the frequency attenuation characteristic of which is controlled by the amplitude of this same modulating signal. The oscillator and variable network are each so arranged and proportioned that when no modulating input signal is applied to either, the oscillator operates at a predetermined frequency, and the variable network is maintained at such value that it passes wave components of the oscillation frequency with only minor attenuation, but offers high attenuation to harmonically related wave components. If a modulating signal wave of sufficient amplitude is applied, both the oscillation frequency of the oscillator and the pass-band of the variable network are shifted by characteristic amounts such that the new oscillation frequency is freely transmitted through the network, but all harmonically related wave components are effectively suppressed. In this manner, the oscillation frequency may be shifted over an exceptionally wide range of frequencies without introducing unwanted wave components into the frequency-shifted output wave product.

Figures 2, 3:
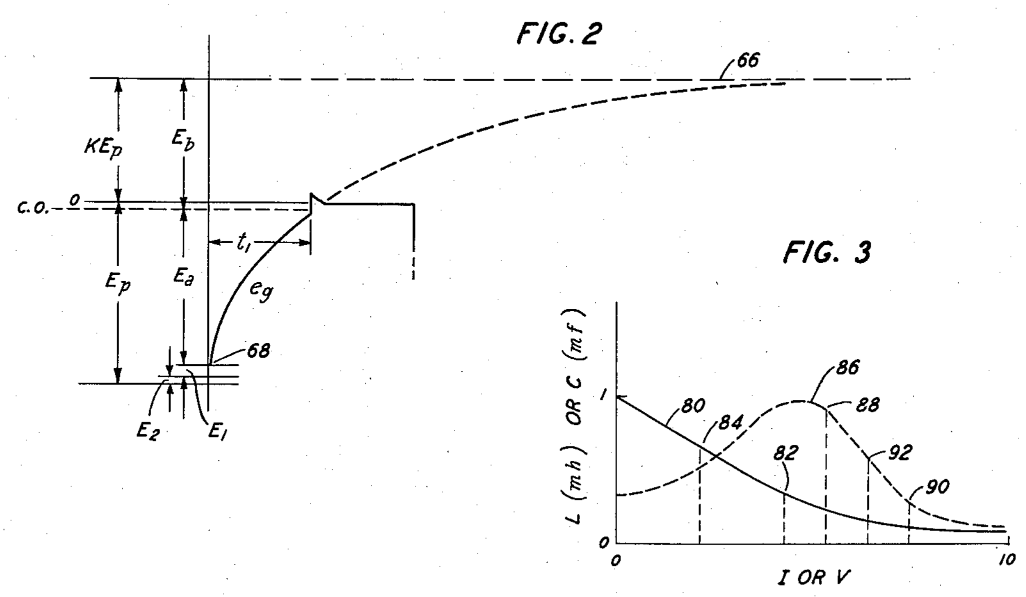

The manner in which this invention achieves the above-described objects may be best understood with reference to the following detailed description of a preferred embodiment thereof, when considered in conjunction with the accompanying drawing, in which:

Fig. 1 shows a modulating device in accordance with the invention in which a multivibrator oscillator and a variable cut-off low-pass filter are employed; and Figs. 2 and 3 are explanatory graphs to which references are made in the detailed description.

Referring now to Fig. 1, the electron discharge devices or vacuum tubes 10 and 12 together with their associated anode resistors 14, 16 and source of anode potential or battery 18 comprise a multivibrator oscillator, in which the anode of each device is coupled to the control grid electrode of the conjugate device through coupling capacitors 20, 22. The control grid electrodes 11, 13 of devices 10 and 12 are connected through grid resistors 24, 26, and the secondary winding 28 of signal input transformer 30 to the movable arm 31 of potentiometer 32, the latter being shunted across potential source 18. The movable arm 31 of potentiometer 32 is positioned in such fashion that there is supplied to the control grid electrodes 11 and 13 a biasing potential, the magnitude of which is chosen in accordance with the principles that are later described herein, and which are more fully disclosed and claimed in my copending application Serial No. 121,031, filed October 12, 1949. In general, although it need not be so in every case, the positioning of arm 31 will be such that the control electrodes are supplied with a biasing potential that is equal to between .6 and .8 of the full potential of source 18. The primary, or input winding 27 of signal input transformer 30, is connected to a suitable source 34 of variable amplitude message signals. The anode of discharge device 12 is connected through coupling capacitor 38 to an output load circuit comprising resistors 40, 42. Resistor 42 is preferably equal to the image impedance of filter 36, and resistor 40 is desirably several times that value to suitably decouple the multivibrator from its load circuit.

Network or filter 36 is connected across output resistor 42. This network comprises inductive and capacitive elements the values of which may be continuously shifted several hundred per cent by the action of separate control forces. The network is here shown as a half-section low-pass filter in order to simplify this detailed description of its structure. It might equally well be of the band-pass type without introducing any complicating factors other than the increased number of bias control circuits. The variable inductive element consists of a pair of substantially identical coils 44 which are wound one on each of the substantially identical saturable core elements 46. A single bias control winding 48 links both core elements. Windings 44 and 48 are so poled respective to one another that voltages arising from current variations in winding 48 are canceled in windings 44. One terminal of bias winding 48 is grounded and the other is connected to the junction of voltage-dividing resistors 52, 52'.

This unit differs from the conventional fixed-inductance unit in that the inductance of windings 44 is controllable in accordance with the magnitude of the current that flows in the bias control winding 48. The construction of such devices is generally well known. In any given instance, the construction of a specific variable inductance element will be determined by the operating characteristics that are desired of it. The core elements 46 will usually be composed of a high permeability metal, for example, a nickel-iron alloy such as Permalloy. The degree of flux saturation in these core elements 46 is a function of their metallic composition, their size and configuration, and the number of ampere-turns in control winding 48. The inductance of coils 44 varies inversely with changes in the degree of flux saturation in core 46. The exact relationship between the current in control winding 48 and the inductance of coils 44 will, of course, depend upon the above-enumerated factors. This relationship will generally be similar to the inductance versus bias control current characteristic that is shown in somewhat idealized form by curve 80 of Fig. 3. Referring to that curve, it will be noticed that in one portion of its operating range (zero to point 82) the change in inductance varies in substantially inverse linear relation to the change in the biasing current. In another portion of its operating range (to the right of point 82) the change in inductance is non-linear with respect to changes in the biasing current. The degree of non-linearity may change in this last-mentioned operating range. By suitably choosing the magnitude of the steady-state biasing current through coil 48, the inductance of coils 44 may be initially fixed at any desired point on the operating characteristic. For reasons which will be later explained, it will be understood that in this described filter 36, the inductance of coils 44 is initially fixed at about the mid-point 84 of the linear portion of the operating characteristic.

Resistors 52, 52' are included in the series circuit proceeding from the grounded terminal of transformer winding 27 through winding 27, resistors 52, 52' and battery 18, the negative terminal of which is grounded. Resistors 52, 52' are so proportioned that the steady-state voltage at their junction is sufficient, when impressed across bias control winding 48, to cause the inductance of coils 44 to rest at about the mid-point 84 (Fig. 3) of the linear portion of their characteristic. The lower end of resistor 52' is connected to the ungrounded terminal of primary winding 27 of transformer 30, and signal-caused variations in the potential of this ungrounded terminal cause corresponding variations in the current through winding 48 and cause the inductance of coils 44 to vary about this mid-point 84 value.

The capacitive element of filter 36 is composed of the bridge-connected substantially-identical variable capacitors 54, 56, 58, 60, each of which is shunted by a voltage-dividing resistor.

The potential source or battery 62 and transformer secondary winding 28' are connected in series across the horizontal pair of bridge terminals. The other, or vertical, pair of bridge terminals are connected between the oscillator output connection at the upper terminal of resistor 42 and ground. Capacitors 54, 56, etc., are of the type in which the capacity is variable in accordance with changes in the potential difference across the dielectric. They each may be, although they need not necessarily be, ceramic capacitors of the type utilizing barium-strontium titanate as the dielectric material, such as is disclosed in United States Patent 2,443,094, dated June 8, 1948, to W. L. Carlson et al. As is there disclosed, the capacitance versus biasing-potential characteristic of such capacitors may be caused to be of substantially the same shape as curve 86 of Fig. 3. From inspection of curve 86, it will be noted that in the region between points 88 and 90 the change in capacitance varies in substantially inverse linear relation to the change in biasing voltage. As in the case of the variable inductance and for the same reason, which reason will be later discussed, each capacitor is biased to approximately the mid-point 92 of the linear portion of its operating characteristic. The magnitude of battery 62 is so chosen that this steady-state bias is applied to the dielectric of these capacitors when no signal is supplied by source 34. Transformer winding 28' is so poled with respect to primary winding 27 and battery 62 is also arranged such that an increasingly positive signal at the ungrounded terminal of primary winding 27 causes an increasing potential to exist across the dielectric of the capacitors. This action causes the capacitance of each capacitor to decrease from the mid-point value of its linear operating range, to which it is biased in the steady-state condition by battery 62. Thus, the instantaneous capacitances of these units change about this mid-point value in response to amplitude changes in the signal from source 34 in the same manner as does the inductance of coils 44 under the same signal input circumstances.

Signals from source 34 are controlled in their maximum amplitude so that when they are superimposed upon the unidirectional biasing current in coil 48 and the unidirectional biasing voltage from battery 62 they do not so change these biasing forces that the inductance or capacitances are operated outside of their regions of linear change.

In the interest of simplicity of description, the Fig. 1 arrangement has been here shown and described as a unit in which the signal potential, as it exists in transformer primary and secondary windings 27, 28', acts directly through linear circuit elements to change the biasing current and biasing voltage of the inductance and capacitors. It will be evident to those skilled in the art that suitable non-linear devices, for example, a grid-controlled vacuum tube, may be inserted between the controlled inductive or capacitive element and the source of variable potential so that the signal potential changes will control the biased or controlled element in any desired manner. Thus even though a specific variable unit may not alone possess the desired variable characteristic, the addition of a suitable non-linear device in its bias control circuit will permit changing this characteristic to the desired pattern or shape.

Also, the inductance and capacitance herein have been described as being biased to the mid-points of their linear operating ranges. It should be appreciated that this represents only one operating condition which in this described embodiment is predicated upon changing both variable elements of filter 36. If, for example, only one variable element of this filter were to be changed, it would be desirable to change its reactance as the square of the change in the biasing control force. Under such circumstances, the variable element would be biased to about the mid-point of its square-law region of operation during its steady-state or no-signal condition.

Before proceeding to a description of the operation of the previously described circuit, the manner in which the oscillator portion of it is stabilized against variations in the anode potential supply will be described with reference to Fig. 2. This figure shows the change of potential $e_g$ on the control grid electrode of one of the discharge devices during one cycle of operation. It will be understood that the same factors control the change of potential on the control grid electrodes 11 and 13; hence the influence of these factors as they affect the potential on only one electrode 11 will be described here.

The objective of the stabilizing process is to keep the cut-off period $t_1$ of device 10 constant, notwithstanding variations in the potential of anode supply 18. The potential curve $e_g$ (Fig. 2) is the conventional exponential condenser charging curve, the rate of change of which controls the cut-off period $t_1$. If the time constant of the grid charging circuit is not changed, the rate of change of this curve and hence the cut-off period $t_1$ can only be affected if the cut-off potential 64, the grid charging potential 66, or the maximum negative potential 68 are varied. The maximum negative potential 68, to which control electrode 11 is driven at the instant of cut-off in tube 10, depends upon its potential with respect to reference ground at a time just preceding the cut-off of tube 10 and the potential change at the anode of tube 12 when that tube changes from its non-conducting to its conducting state. The control electrode terminal of capacitor 22 is at the potential $E_2$ of electrode 11 before cut-off. As is usual in the design of multivibrator oscillator circuits, capacitor 22 and resistor 16 are chosen of such magnitudes that the charging of capacitor 22 is substantially completed before tube 10 is cut off. When discharge device 12 conducts current, its anode is dropped from potential $E_p$ to a new potential $E_1$ volts above ground potential. This potential $E_1$ represents the voltage drop in the anode-cathode circuit of this tube. Thus, the maximum negative potential 68 is numerically equal to the potential $E_p$ of source 18 minus the anode-cathode potential $E_1$ of discharge device 12 minus the existing potential $E_2$ on control electrode 11 of discharge device 10. Stated otherwise, this maximum negative potential 68 is equal to the maximum anode potential $E_p$ reduced by the residual potentials $E_1$ and $E_2$. The exponontial charge of capacitor 22 and, hence, the potential on electrode 11 proceeds from this maximum negative potential 68 to the cut-off potential $E_{co}$ at point 64 where, at time $t_1$, discharge device 10 starts current conduction. The total voltage excursion ($E_a$, Fig. 2) between points 64, 68 is, $E_a=E_p-E_1-E_2-E_{co}$. If tube 10 did not conduct current when the potential of electrode 11 reached $E_{co}$, the charging of capacitor 22 would follow the dotted curve of Fig. 2 and approach the charging potential $KE_p$ (broken line 66) as an asymptote. This additional charging would represent an additional voltage excursion ($E_b$, Fig. 2) between point 64 and the grid charging potential 66, and would equal, $E_b=KE_p+E_{co}$; where $KE_p$ is a fractional part of the total potential $E_p$ of source 18. The equation of the change of potential on the control grid may be expressed:

$$e_g=-(E_a+E_{co})+(E_a+E_b)(1-e^{-t/T})$$

where T is the time constant of capacitor 22 and resistor 24. Substituting the values of $E_a$ and $E_b$ from the above equations and assigning the cut-off value $-E_{co}$ to $e_g$, it is found that $$t_1=T\log_e\frac{[E_p(1+K)-E_1-E_2]}{(KE_p+E_{co})}$$

From this equation, it will be noted that the cut-off interval $t_1$ will remain a constant quantity if the logarithmic quantity remains constant. This quantity will remain constant if $E_1$, $E_2$ and $E_{co}$ are zero; or in the alternative, if these three values change in a compensatory fashion such that their ratio in the above equation remains constant. The values $E_1$, $E_2$ and $E_{co}$ change with changes in the anode supply potential $E_p$, but they change at rates which depend upon the grid-biasing potential, that is, the fractional part $KE_p$ and $E_p$ that exists at the arm 31 of potentiometer 32. In each instance, it is possible to proportion the potential $KE_p$ at the movable arm 31 such that the collective effect of the changes in these values $E_1$, $E_2$ and $E_{co}$ renders the logarithmic quantity substantially constant. In a large percentage of cases, it will be found that the value of $KE_p$ is equal to between $.6E_p$ and $.8E_p$. As a practical aid in selecting the correct position of arm 31, and hence the correct value of $KE_p$, it will generally be found that when $KE_p$ is less than its optimum value, an increase in the potential of source 18 results in a decrease in the oscillation frequency and vice versa. Conversely, if $KE_p$ is greater than its optimum value, an increase in the potential of source 18 results in increased oscillation frequency.

Referring now to Fig. 1, it will be noted that the capacitive and inductive elements of network 36 form a simple half-section low-pass filter structure. The relations in a half-section filter of the type here shown are:

$$L=\frac{R_I}{2\pi f_c}, C=\frac{1}{2\pi f_c R_I}$$

and $$f_c=\frac{1}{2\pi\sqrt{LC}}$$

where $f_c$ represents the cut-off frequency and $R_1$ the terminating resistance of filter 36. These relations explain the reason for the previous statement that in this described filter 36, in which both the inductance and capacitance are varied, that the biasing current and the biasing potential were chosen of such size that the respective unit was initially biased to the midpoint of its linear operating range (points 84 and 92 on the curves of Fig. 3). Therefore, as signals from source 34 cause the potential of the ungrounded terminal of transformer primary winding 27 to change with respect to ground, the potential across the dielectric of capacitors 54, 56, etc., and the current through the biasing winding 48 also changes. The proper choice of circuit constants assures that for a given signal input, the change in inductance of coils 44 and the change in capacitance of capacitors 54, 56, etc., will be of about the same order and in inverse linear relation to the change in biasing potential that is caused by the applied input signal. Under these circumstances, the cut-off frequency $f_c$ of filter 36 shifts in direct linear relation to changes in the amplitude of the signal from source 34, since the cut-off frequency characteristic of this filter follows the law:

$$f_c=\frac{1}{2\pi\sqrt{LC}}$$

Transformer secondary winding 28, which is connected in series between the movable arm 31 and grid leak resistors 24, 26, is so poled that an increasingly positive signal at the ungrounded terminal of primary winding 27 causes an increasingly positive potential to be supplied to control electrodes 11 and 13. Increased potential at electrodes 11 and 13 causes the oscillation frequency of the multivibrator to increase in a substantially linear relationship to the change in applied potential. Therefore, as the modulating signal from source 34 increases in amplitude, the frequency of the multivibrator oscillator and the cut-off frequency of filter 36 are also increased. The reverse of this process occurs when the modulating signal amplitude is decreased. Ideally, the filter inductance and capacitance will be so controlled that their ratio is constant. Actually, maintenance of this constant ratio relationship is usually not critical, and in many instances, it will be satisfactory to vary only that one of the filter elements that may be most conveniently changed. Also, the cut-off frequency of filter 36 and the oscillation frequency of the multivibrator will preferably vary at the same linear rate-of-change with respect to signal amplitude variations. Notwithstanding that a linear rate-of-change may, in general, be the desirable arrangement, it should be understood that it is not essential. Under certain conditions, it may be desirable that the rate-of-change depart from linearity. This may be easily arranged through the use of suitable non-linear devices in the control circuits, as was earlier suggested herein. Actually, this same rate-of-change relationship is not unduly critical, since it is only necessary that filter 36 suppress wave components that are in harmonic relationship to the desired fundamental oscillation frequency. In some circuit arrangements, this will necessitate suppression of the second and all higher harmonics. A considerable reduction of the second harmonic wave component may be secured through balanced construction of the multivibrator, in which case, the third harmonic of the fundamental frequency will provide the limit that the rate-of-change of these units may digress.

Since the cut-off frequency of filter 36 may thus be shifted through a wide range of frequencies, the exact value of which will depend upon which of the many conventional filter structures is used, the number of elements that are varied and the structure of the variable elements, it is apparent that the frequency of the multivibrator may also be shifted through a wide range without introducing unwanted wave components into the output wave product. The extent of this frequency shift approaches a value equal to twice the nominal or mean carrier frequency. This is in sharp contrast to the previously known systems of this general type in which the limitations that are imposed by the fixed cut-off output filter restrict the oscillator's frequency variation or swing to about forty per cent of the nominal or mean carrier frequency. The benefits that accrue from this wider frequency variation, or increased deviation ration, will to a certain extent depend upon the manner in which the frequency modulator is utilized. If used in a conventional frequency modulated communication system, it would make available increased receiving gain as well as improved signal-to-noise relations. Other obvious advantages that result from its use will occur to those skilled in the related art.

Although this invention has been described as being embodied in a preferred type of frequency modulation system in which a specified type of multivibrator oscillator is associated with a conventional half-section low-pass filter of simplified design, it should be understood that the invention is not limited to the described circuit arrangement. This invention may be practiced notwithstanding that the variable filter and/or the multivibrator oscillator may have other known configurations, and also irrespective of whether the oscillator has been stabilized against the effect of variations in the anode potential supply in the manner described herein. It is to be expected that variations which do not depart from the spirit and scope of this invention will occur to those skilled in the related art.

What is claimed is:

1. A transmission system for producing a frequency modulated signal, the frequency variations of which are substantially linearly related to amplitude variations in an applied modulating signal, and the unmodulated or mean carrier frequency of which is substantially independent of variations in the circuit anode potential supply, said system comprising a multivibrator oscillator and a variable electrical network connected to the output thereof; said multivibrator including a pair of electron discharge devices each including a cathode electrode and a control grid electrode which assumes a negative potential $E_a$ volts below its cut-off potential during each oscillatory cycle, a source of anode potential $E_p$ for said multivibrator, means to supply to said control grid electrodes a biasing potential from said source, said potential being positive with respect to said cathodes and variable above and below a value $E_b$ volts positive with respect to the cut-off potential of said electrodes in continuous increments in accordance with amplitude variations in said modulating signal such that the ratio $$\frac{E_b}{E_a}$$

is a substantially constant value for varying potential values $E_p$ of said source, said means comprising a transformer having a primary and two secondary windings, said primary winding being connected to the source of said modulating signal and one of said secondary windings being connected in series between said control grid electrodes and said anode potential source at a potential point $E_b$ volts above said electrode cut-off potential whereby the potential supplied to said electrodes varies above and below said value $E_b$ in accordance with amplitude variations in the modulating signal; said electrical network comprising a series inductive element, the reactance of which varies in accordance with variations in the flux saturation of its core, and a shunt capacitive element, the reactance of which varies in accordance with potential variations across its dielectric, means for varying the potential across the dielectric of said capacitive element in accordance with amplitude variations in said modulating signal, said means comprising a source of biasing potential and the other of said transformer secondary windings in series connection across said capacitive element, and circuit connection means for supplying to said inductive element a portion of said varying-amplitude modulating signal currents to vary the flux saturation of the core in accordance with the amplitudes of said currents; the cut-off frequency of said network being maintained at a value higher than said fundamental oscillation frequency and less than frequencies in harmonic relation to said fundamental.

2. A transmission system for producing a frequency modulated signal, the frequency variations of which are substantially linearly related to amplitude variations in an applied modulating signal, and the unmodulated or mean carrier frequency of which is substantially independent of variations in the circuit anode potential supply, said system comprising a multivibrator oscillator and a variable electrical network connected to the output thereof; said multivibrator including a pair of electron discharge devices each including a cathode electrode and a control grid electrode which assumes a negative potential $E_a$ volts below its cut-off potential during each oscillatory cycle, a source of anode potential $E_p$ for said multivibrator, means to supply to said control grid electrodes a biasing potential from said source, said potential being positive with respect to said cathodes and variable above and below a value $E_b$ volts positive with respect to the cut-off potential of said electrodes in continuous increments in accordance with amplitude variations in said modulating signal such that the ratio $$\frac{E_b}{E_a}$$

is a substantially constant value for varying potential values $E_p$ of said source, said means comprising a transformer having a primary and two secondary windings, said primary winding being connected to the source of said modulating signal and one of said secondary windings being connected in series between said control grid electrodes and said anode potential source at a potential point $E_b$ volts above said electrode cut-off potential whereby the potential supplied to said electrodes varies above and below said value $E_b$ in accordance with amplitude variations in the modulating signal; said electrical network comprising inductive and capacitive impedance elements the reactance of at least one of which is variable in accordance with variations in potential across said element, and circuit connecting means including a source of potential to impress across said element a potential variable in continuous increments in accordance with amplitude variations in said modulating signal.

3. A transmission system for producing a frequency modulated signal, the frequency variations of which are substantially linearly related to amplitude variations in an applied modulating signal, and the unmodulated or mean carrier frequency of which is substantially independent of variations in the circuit anode potential supply, said system comprising a multivibrator oscillator and a variable electrical network connected to the output thereof; said multivibrator including a pair of electron discharge devices each including a cathode electrode and a control grid electrode which assumes a negative potential $E_a$ volts below its cut-off potential during each oscillatory cycle, a source of anode potential $E_p$ for said multivibrator, means to supply to said control grid electrodes a biasing potential from said source, said potential being positive with respect to said cathodes and variable above and below a value $E_b$ volts positive with respect to the cut-off potential of said electrodes in continuous increments in accordance with amplitude variations in said modulating signal such that the ratio $$\frac{E_b}{E_a}$$

is a substantially constant value for varying potential values $E_p$ of said source, said means comprising a transformer having a primary and two secondary windings, said primary winding being connected to the source of said modulating signal and one of said secondary windings being connected in series between said control grid electrodes and said anode potential source at a potential point $E_b$ volts above said electrode cut-off potential whereby the potential supplied to said electrodes varies above and below said value $E_b$ in accordance with amplitude variations in the modulating signal; said electrical network comprising inductive and capacitive impedance elements, the inductive reactance of one of which is variable in accordance with variations in the flux saturation of said element, and circuit connecting means to supply a portion of the varying-amplitude signal currents to said elements to vary its flux saturation and its inductive reactance as said signal current amplitude changes.

4. A transmission system for producing a frequency modulated signal, the frequency variation of which are substantially linearly related to amplitude variations in an applied modulating signal, said system comprising a multivibrator oscillator and a variable electrical network connected to the output thereof; said multivibrator including a pair of electron discharge devices each including a cathode and a control grid electrode, a source of control grid biasing potential, means to supply to said control grid electrodes a potential positive with respect to said cathodes and variable in continuous increments in accordance with amplitude variations in said modulating signal, said means comprising a transformer having a primary and two secondary windings, said primary winding being connected to a source of said modulating signal and one of said secondary windings being connected in series between said control grid biasing potential source and said control electrodes whereby the potential supplied to said electrodes varies above and below said biasing potential value in accordance with amplitude variations in the modulating signal; said electrical network comprising a series inductive element, the inductance of which is variable in accordance with variations in the current flowing in a flux-saturation control winding thereon, and a shunt capacitive element, the reactance of which is variable in accordance with potential variations across its dielectric, means for varying the potential across said dielectric in accordance with amplitude variations in said modulating signal, said means comprising a source of biasing potential and the other of said transformer secondary windings in series connection across said dielectric, and circuit connection means to transmit a portion of said varying-amplitude modulating signal currents through said flux-saturation control winding of said variable inductance element to vary the inductance of said element, the cut-off frequency of said network being maintained higher than said fundamental oscillation frequency and less than frequencies in harmonic relation to said fundamental.

5. A transmission system for producing a frequency modulated signal, the frequency variations of which are substantially linearly related to amplitude variations in an applied modulating signal, said system comprising a multivibrator oscillator and a variable electrical network connected to the output thereof; said multivibrator including a pair of electron discharge devices each including a cathode and a control grid electrode, a source of control grid biasing potential for said multivibrator, means to supply to said control grid electrodes a potential positive with respect to said cathodes and variable in continuous increments in accordance with amplitude variations in said modulating signal, said means comprising a transformer having a primary and two secondary windings, said primary winding being connected to a source of said modulating signal and one of said secondary windings being connected in series between said control grid biasing potential source and said control electrodes whereby the potential supplied to said electrodes varies above and below said biasing potential value in accordance with amplitude variations in the modulating signal, said electrical network comprising inductive and capacitive impedance elements, the reactance of at least one of which is variable in accordance with variations in potential across said element, and circuit connecting means including a source of potential to impress across said element a potential variable in continuous increments in accordance with amplitude variations in said modulating signal.

6. A transmission system for producing a frequency modulated signal, the frequency variations of which are substantially linearly related to amplitude variations in an applied modulating signal, said system comprising a multivibrator oscillator and a variable electrical network connected to the output thereof; said multivibrator including a pair of electron discharge devices each including a cathode and a control grid electrode, a source of control grid biasing potential for said multivibrator, means to supply to said control grid electrodes a potential positive with respect to said cathodes and variable in continuous increments in accordance with amplitude variations in said modulating signal, said means comprising a transformer having a primary and two secondary windings, said primary winding being connected to a source of said modulating signal and one of said secondary windings being connected in series between said control grid biasing potential source and said control electrodes whereby the potential supplied to said electrodes varies above and below said biasing potential value in accordance with amplitude variations in the modulating signal, said electrical network comprising inductive and capacitive impedance elements, the inductive reactance of one of which is variable in accordance with variations in the flux saturation of said element, and circuit connecting means to supply a portion of the varying-amplitude signal currents to said element to vary its flux saturation and its inductive reactance as said signal current amplitude changes.

7. A transmission system for producing a frequency modulated signal, the frequency variations of which are substantially linearly related to amplitude variations in an applied modulating signal, said system comprising a multivibrator oscillator and a variable frequency-selective electrical network connected to the output thereof; said multivibrator including a pair of electron discharge devices each including a cathode and a control electrode, means to bias said control electrode positive with respect to said cathode and variable in continuous increments in accordance with amplitude variations in said modulating signal; said electrical network comprising inductive and capacitive impedance elements, the reactance of at least one of which is variable in accordance with variations in potential across said element, and circuit connecting means to impress across said variable element a potential variable in accordance with amplitude variations of said modulating signal for maintaining the cut-off frequency of said network higher than the fundamental oscillation frequency and less than frequencies in harmonic relation to said fundamental.

8. In a frequency modulation system a multivibrator oscillator comprising a pair of electron discharge devices each having a control grid electrode and a cathode electrode, means to supply a potential to said control grid electrodes, said potential being positive with respect to said cathodes and variable in continuous increments in accordance with amplitude variations in a modulating signal, thereby to vary the oscillation frequency of said multivibrator over a wide range in specified relation to variations in said potential, variable electrical network means including a plurality of reactive elements connected to the output of said multivibrator to eliminate wave components in harmonic frequency relation to said variable oscillation frequency, the reactance of at least one of which is variable in accordance with variations in potential across said element, and circuit connecting means to impress across said variable element a potential variable in accordance with amplitude variations in said modulating signal in such manner that the frequency-attenuation characteristic of said network varies as the oscillation frequency of said multivibrator is varied.

9. An electrical device for producing a sinusoidal signal the frequency of which varies in substantially linear relationship to amplitude changes in an applied signal which device comprises a positively biased multivibrator oscillator having an input terminal connected to both of its control electrodes and an output terminal connected to at least one of its anode-cathode circuits, an electrical network connected to said output terminal for suppressing oscillatory wave components which are in harmonic frequency relation to the oscillation frequency of said multivibrator, said network including an impedance element the reactance of which decreases as the difference in potential across said element is increased, and circuit means for simultaneously supplying to said input terminal and to said impedance element said variable amplitude applied signal so that the oscillation frequency of said multivibrator and the frequency transmission capabilities of said network are increased in unison as the amplitude of said signal is increased.

10. An electrical device for producing sinusoidal electrical signals the frequency of which varies in substantially linear relationship to amplitude changes in an applied signal, which device comprises a positive biased multivibrator oscillator having an input terminal connected to its control electrodes and an output terminal connected to an anode-cathode circuit thereof, a variable electrical network connected to said output terminal for suppressing oscillatory wave components that are in harmonic frequency relation to the oscillation frequency of said multivibrator, said network including an inductive and a capacitive impedance element, the reactance of each of which is variable in accordance with control potentials supplied thereto, and circuit means for simultaneously supplying to said input terminal and to said impedance elements said variable amplitude signal potentials so that the frequency of oscillation of said multivibrator and the frequency-attenuation characteristic of said network are shifted upwardly in the spectrum as the amplitude of said signal potential is increased.

11. A relaxation oscillator producing a wanted wave component of specified frequency and a plurality of unwanted wave components in harmonic frequency relation to said wanted component, an oscillation output circuit for said oscillator, a source of signals to vary the frequency of oscillation of said relaxation oscillator in specified relation to the amplitude of said signal, frequency-sensitive selective means connected to said output circuit to suppress in said circuit all wave components except said wanted component, said frequency selective means including a plurality of reactive elements, the reactance of at least one of which is variable in accordance with variations in potential across said element, and circuit means responsive to said signals and operative upon said selective means to control the frequency-sensitive characteristics of said selective means to change the frequency of the wave component that is not suppressed by said selective means as the relaxation oscillator is varied in frequency by said signals.

MILTON E. MOHR.

REFERENCES CITED

The following references are of record in the file of this patent:

UNITED STATES PATENTS

| Number | Name | Date |
|---|---|---|
| 2,338,395 | Bartelink | Jan. 4, 1944 |
| 2,436,834 | Stodola | Mar. 2, 1948 |
| 2,470,028 | Gordon | May 10, 1949 |